United States Patent [19]

Lickfield et al.

[11] Patent Number: 5,484,645
[45] Date of Patent: Jan. 16, 1996

[54] COMPOSITE NONWOVEN FABRIC AND ARTICLES PRODUCED THEREFROM

[75] Inventors: Deborah K. Lickfield, Easley; Mark H. S. Berman, Simpsonville; Robert F. Hyslop, Simpsonville; Andrew R. Oleszczuk, Simpsonville, all of S.C.; Scott L. Gessner, Encinitas, Calif.; Jared A. Austin, Greer, S.C.

[73] Assignee: Fiberweb North America, Inc., Simpsonville, S.C.

[21] Appl. No.: 163,433

[22] Filed: Dec. 8, 1993

Related U.S. Application Data

[63] Continuation-in-part of Ser. No. 896,323, Jun. 10, 1992, Pat. No. 5,415,925, and a continuation-in-part of Ser. No. 93,796, Jul. 19, 1993.

[51] Int. Cl.$^6$ ..................................................... B32B 27/14
[52] U.S. Cl. ......................... 428/198; 128/849; 156/167; 156/290; 428/192; 428/194; 428/219; 428/284; 428/286; 428/287; 428/296; 428/297; 428/298; 428/315.9; 428/373; 428/374
[58] Field of Search .................................... 428/219, 286, 428/287, 296, 299, 284, 198, 297, 298, 373, 374, 284, 315.9, 192, 194; 156/167, 290; 128/849

[56] References Cited

U.S. PATENT DOCUMENTS

| | | |
|---|---|---|
| 4,041,203 | 8/1977 | Brock et al. . |
| 4,196,245 | 4/1980 | Kitson et al. . |
| 4,310,594 | 1/1982 | Yamazaki et al. . |
| 4,373,000 | 2/1983 | Knoke et al. . |
| 4,485,062 | 11/1984 | Dawes et al. . |
| 4,504,539 | 3/1985 | Petracek et al. . |
| 4,508,113 | 4/1985 | Malaney . |
| 4,511,615 | 4/1985 | Ohta . |
| 4,522,868 | 6/1985 | Ohuchi et al. ........................ 428/224 |
| 4,555,811 | 12/1985 | Shimalla . |
| 4,595,629 | 6/1986 | Mays . |
| 4,652,484 | 3/1987 | Shiba et al. . |
| 4,657,804 | 4/1987 | Mays et al. . |
| 4,818,597 | 4/1989 | DaPonte et al. ........................ 428/284 |
| 4,863,785 | 9/1989 | Berman et al. . |
| 4,874,666 | 10/1989 | Kubo et al. . |
| 4,902,564 | 2/1990 | Israel et al. . |
| 5,108,827 | 4/1992 | Gessner . |
| 5,145,727 | 9/1992 | Potts et al. . |
| 5,161,686 | 11/1992 | Weber et al. . |
| 5,173,356 | 12/1992 | Eaton et al. ........................ 428/219 |
| 5,188,885 | 2/1993 | Timmons et al. . |
| 5,229,191 | 7/1993 | Austin . |
| 5,294,482 | 3/1994 | Gessner ........................ 428/287 |

FOREIGN PATENT DOCUMENTS

| | | |
|---|---|---|
| 164739 | 12/1985 | European Pat. Off. . |
| 405793 | 1/1991 | European Pat. Off. . |
| 416620 | 3/1991 | European Pat. Off. . |
| 546837 | 6/1993 | European Pat. Off. . |
| 586937 | 3/1994 | European Pat. Off. . |

*Primary Examiner*—James J. Bell
*Attorney, Agent, or Firm*—Bell, Seltzer, Park & Gibson

[57] ABSTRACT

The invention is directed to a composite nonwoven fabric comprising first and second nonwoven webs of spunbonded substantially continuous thermoplastic filaments, and a nonwoven hydrophobic microporous web of thermoplastic meltblown microfibers sandwiched between the first and second nonwoven webs. The filaments of the nonwoven spunbond webs are formed of continuous multiconstituent filaments which include a lower melting gamma radiation stable polyethylene polymer component and one or more higher melting gamma radiation stable polymer constituents, wherein a substantial portion of the surfaces of the multiconstituent filaments consists of the lower melting gamma radiation stable polyethylene constituent. The nonwoven hydrophobic microporous web is formed from a gamma radiation stable polyethylene polymer. The webs are bonded together to form the composite nonwoven fabric by discrete point bonds in which the polyethylene constituent of said multiconstituent filaments and the polyethylene of said third nonwoven web are fused together.

17 Claims, 2 Drawing Sheets

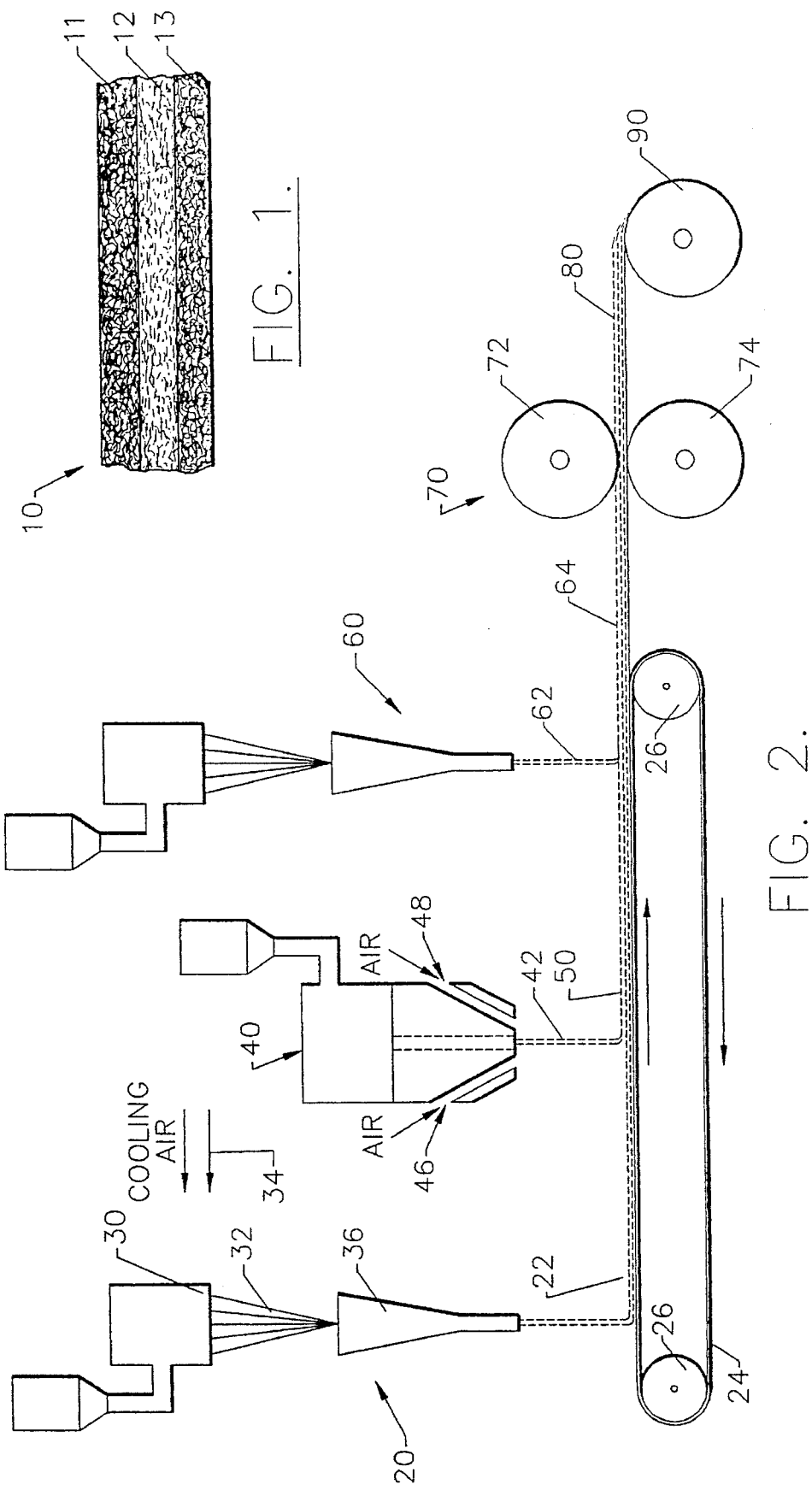

COMPOSITE NONWOVEN FABRIC AND ARTICLES PRODUCED THEREFROM

CROSS REFERENCE TO RELATED APPLICATIONS

This application is a continuation-in-part of U.S. patent application Ser. No. 07/896,323, filed Jun. 10, 1992, now U.S. Pat. No. 5,415,925, and a continuation-in-part of U.S. patent application Ser. No. 08/093,796 filed Jul. 19, 1993.

FIELD OF THE INVENTION

The invention relates to nonwoven fabrics and more specifically, to composite nonwoven barrier fabrics particularly suited for medical applications.

BACKGROUND OF THE INVENTION

Nonwoven barrier fabrics have been developed which impede the passage of bacteria and other contaminants and which are used for disposable medical articles, such as surgical drapes, disposable gowns and the like. For example, such barrier fabrics can be formed by sandwiching an inner fibrous web of thermoplastic meltblown microfibers between two outer nonwoven webs of substantially continuous thermoplastic spunbonded filaments. The fibrous meltblown web provides a barrier to bacteria or other contaminants, while the outer spunbonded layers provide good strength and abrasion resistance to the composite nonwoven fabric. Examples of such fabrics are described in U.S. Pat. No. 4,041,203 and U.S. Pat. No. 4,863,785.

In the manufacture of this type of fabric, the respective nonwoven layers are thermally bonded together to form a unitary composite fabric. Typically, the thermal bonding involves passing the nonwoven layers through a heated patterned calender and partially melting the inner meltblown layer in discrete areas to form fusion bonds which hold the nonwoven layers of the composite together. Without sufficient melting and fusion of the meltblown layer, the composite fabric will have poor inter-ply adhesion. However, unless the thermal bonding conditions are accurately controlled, the possibility exists that the thermal bond areas may be heating excessively, causing "pinholes" which can compromise or destroy the barrier properties of the inner meltblown layer. Thus in practice, the thermal bonding conditions which are used represent a compromise between the required inter-ply adhesion strength on the one hand, and the required barrier properties which must be provided by the meltblown layer on the other.

The conventional spunbond-meltblown-spunbond type barrier fabrics also have limitations in the types of sterilization procedures which can be used. For some applications, it is desired that the fabric or garment be sterilized in the final stages of manufacture by exposure to gamma radiation. For example, the fabric or garment may first be sealed in a protective package, and then exposed to gamma radiation to sterilize the package and its contents. However, sterilization by gamma irradiation has been found to be unsuitable for many of the known medical barrier fabrics. Some of the polymers conventionally used in such medical barrier fabrics, such as conventional grades of polypropylene for example, are especially sensitive to degradation by gamma irradiation. Fabrics produced from such polymers tend to lose strength over time, becoming brittle as a result of the gamma irradiation. Also, the instability of the polymers to the irradiation results in the generation of distasteful odors in the product which are unacceptable to the consumer.

Conventional spunbond-meltblown-spunbond type barrier fabrics have limitations in the way they can be fabricated into a product, such as surgical gowns, surgical drapes, and the like. Typically these type of fabrics do not lend themselves to forming seams in a fabric construction by thermal bonding or welding. Further, such seams can be weak, and lack the integrity needed to provide a complete barrier to the passage of contaminants. Fabrics formed of conventional spunbond-meltblown-spunbond fabrics can be constructed by sewing, but this can be disadvantageous, since punching the fabric with a needle results in holes in the fabric, which impairs the integrity of the fabric and the continuity of the barrier properties thereof.

Various attempts have been made to overcome these limitations. For example, efforts have been made to render the polypropylene polymers more stable to gamma irradiation, such as by incorporating certain additives in the polymer to reduce the amount of degradation. For example, U.S. Pat. No. 4,822,666 describes a radiation stabilized polypropylene fabric in which a long-chain aliphatic ester is added to the polymer. U.S. Pat. No. 5,041,483 discloses incorporating a rosin ester into the polypropylene to stabilize the polymer and reduce the tendency toward odor generation after gamma irradiation. However, the use of such additives adds expense to the manufacturing process. Further, polypropylene is difficult to render gamma-stable at standard commercial dosage levels, even with the use of additives or stabilizers.

The component layers of spunbond-meltblown-spunbond type barrier fabrics can also be formed of polymers which are stable to gamma irradiation. Such polymers include polyamides, polyesters, some polyolefins, such as polyethylene, and the like. However, fabrics formed using high melt temperature polymers, such as polyamide and polyester, are not easily thermally bonded. The high temperatures which are required to sufficiently bond the fabric can destroy the meltblown barrier properties and the structure of the outer spunbonded webs. Adhesives can be used to bond the high melt temperature layers together, but this can result in stiffness of the resultant fabric and adds cost.

It would therefore be advantageous to provide a fabric that provides a barrier to the transmission of contaminants and which retains its strength and does not create an unpleasant odor when sterilized in the presence of gamma radiation. It would also be advantageous to provide such a fabric which exhibits good aesthetic properties, such as desirable softness, drape and breathability, as well as good strength and abrasion resistance, and which can be easily constructed into a product, such as a surgical gown.

SUMMARY OF THE INVENTION

The present invention provides composite nonwoven fabrics having desirable barrier properties and which are stable to gamma irradiation. The composite nonwoven fabrics of the invention include first and second spunbonded nonwoven web of substantially continuous thermoplastic filaments, and a third nonwoven web sandwiched between the first and second webs and containing one or more hydrophobic microporous layers which form a barrier which is highly impervious to bacteria but permeable to air. The nonwoven webs are formed of polymers which are stable to gamma irradiation. The spunbonded webs are engineered so that the webs are bonded together to form a composite fabric without compromising the barrier properties of the microporous layer. More particularly, the spunbonded nonwoven webs are formed of continuous multiconstituent filaments which include a lower melting gamma radiation stable polyethylene polymer component and one or more higher melting gamma radiation stable polymer constituents, wherein the lower melting gamma radiation stable polyethylene constituent is present over a substantial portion of the surface of the filament and the higher melting polymer constituent is in a substantially continuous form along the length of the filaments. The nonwoven microporous layer or layers may comprise a web of meltblown microfibers formed from a gamma radiation stable polyethylene polymer. The webs are bonded together to form the composite nonwoven fabric by discrete point bonds in which the polyethylene constituent of said multiconstituent filaments and the polyethylene microfibers of said third nonwoven web are fused together.

The composite nonwoven fabric of this invention is characterized by having an excellent balance of strength, breathability, and barrier properties, as well as stability to gamma radiation, which properties make the fabric particularly useful in medical and industrial applications for use as protective garments. Composite nonwoven fabrics of this invention have a grab tensile strength of at least 15 pounds in the cross direction (CD) and 25 pounds in the machine direction (MD) and a Gurley air permeability of at least 35 cfm for fabrics having a basis weight in the range of 40 to 120 gsm. The excellent barrier properties of the fabrics of this invention are illustrated by high hydrostatic head ratings, typically 35 cm or greater, and by bacterial filtration efficiency (BFE) ratings of 85 percent and higher.

In one embodiment of the invention, the continuous filaments of the spunbonded nonwoven webs have a bicomponent polymeric structure. Such bicomponent polymeric structures include sheath/core structures, side-by-side structures, and the like. Preferably, the bicomponent structure is a sheath/core bicomponent structure wherein the sheath is formed from polyethylene and the core is formed from polyester.

In another embodiment of the invention, the continuous filaments of the spunbonded nonwoven web are formed of a blend of at least two different thermoplastic polymers. The polymer blend comprises a dominant phase and at least one phase dispersed therein. Illustrative of blends in accordance with the invention are blends wherein the dominant phase is a polymer selected from the group consisting of polyamides and polyesters, and the dispersed phase is polyethylene.

The composite fabrics of the present invention can be sealed or seamed by fusing the lower melting polyethylene constituent by means of a thermal heat sealer, heated die, ultrasonic sealer, RF sealer or the like. This property is particularly advantageous in fabricating products such as protective garments from the composite fabric. Two or more pieces of the composite fabric can be joined together by forming a continuous seam by fusion. The continuous fusion bonded seam maintains the protective barrier properties of the fabric along the seam, whereas other conventional methods, such as sewing, require penetration of the nonwoven barrier layer, and may thus risk disrupting the barrier properties.

BRIEF DESCRIPTION OF THE DRAWINGS

The invention will be understood more fully from the detailed description which follows, and from the accompanying drawings, in which FIG. 1 is a diagrammatical cross-sectional view of a composite nonwoven fabric in accordance with the invention;

FIG. 2 schematically illustrates one method embodiment for forming a composite nonwoven fabric of the invention;

DETAILED DESCRIPTION OF THE INVENTION

Figure 3:
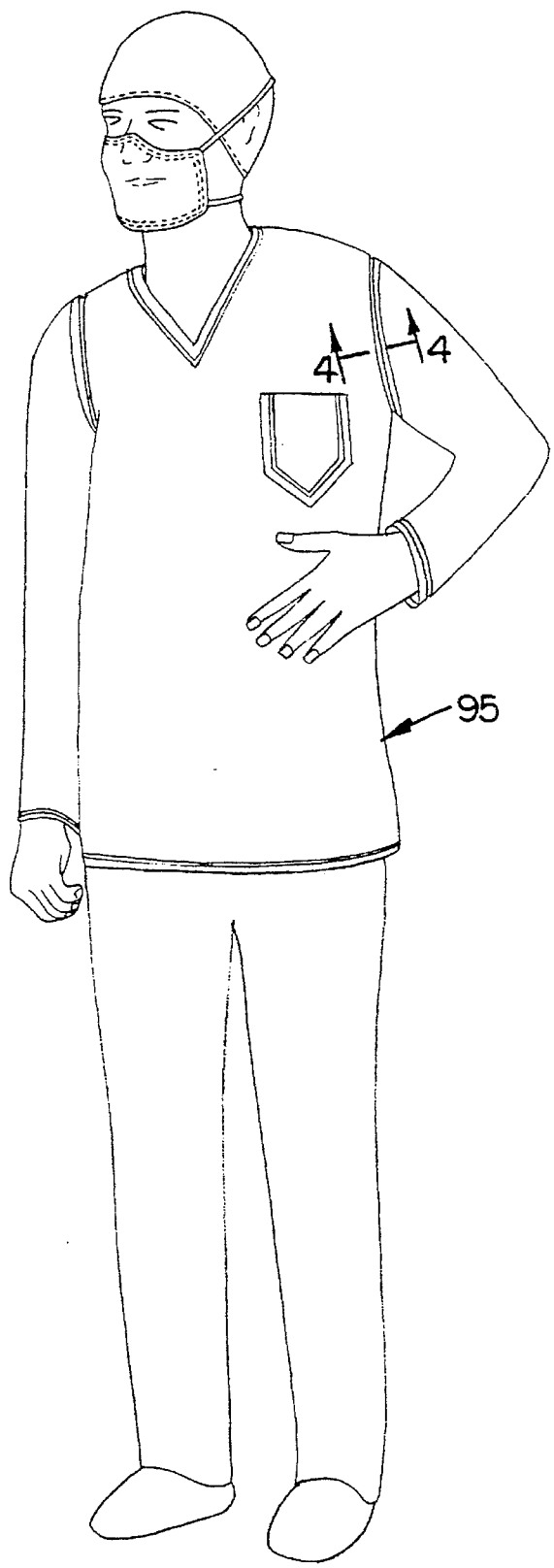
FIG. 3 illustrates a protective garment formed from composite nonwoven fabrics of the invention.

FIG. 1 is a diagrammatical cross-sectional view of a composite nonwoven fabric in accordance with one embodiment of the invention. The fabric, generally indicated at 10, is a three ply composite comprising an inner ply 12 sandwiched between outer plies 11 and 13. The composite fabric 10 has good strength, flexibility and drape. The barrier properties of the fabric 10 make it particularly suitable for medical applications, such as surgical gowns, sterile wraps, surgical drapes, caps, shoe covers, and the like, but the fabric is also useful for any other application where barrier properties would be desirable, such as overalls or other protective garments for industrial applications for example.

Outer ply 11 may suitably have a basis weight of at least about 3 $g/m^2$ and preferably from about 10 $g/m^2$ to about 30 $g/m^2$. In the embodiment illustrated, ply 11 is comprised of continuous multiconstituent filaments which have been formed into a nonwoven web by a conventional spunbonding techniques. Preferably, the filaments of the spunbonded fabric are prebonded at the filament crossover points to form a unitary cohesive spunbonded web prior to being combined with the other webs of the composite fabric. Outer ply 13 is also a spunbonded nonwoven web of substantially continuous thermoplastic filaments. In the embodiment illustrated, ply 13 is a nonwoven web of similar composition and basis weight as outer ply 11.

The multiconstituent filaments of ply 11 have a lower melting thermoplastic polymer constituent and one or more higher melting thermoplastic constituents. For purposes of this invention, it is important that a significant portion of the filament surface be formed by the lower melting polymer constituent, so that the lower melting constituent will be available for bonding, as explained more fully below. At least one of the higher melting constituents should be present in the multiconstituent filament in a substantially continuous form along the length of the filament for good tensile strength. Preferably the lower melting polymer constituent should have a melting temperature at least 5° C. below that of the higher melting constituent, so that at the temperatures employed for thermal bonding of the plies of the composite fabric the higher melting constituent retains its substantially continuous fibrous form to provide a strengthening and reinforcing function in the composite fabric.

The particular polymer compositions used in the higher and lower melting constituents of the multiconstituent filaments may be selected from those gamma radiation stable polymers conventionally used in forming melt-spun fibers. Particularly preferred for the lower melting polymer constituent is polyethylene, including polyethylene homopolymers, copolymers and terpolymers. Examples of suitable polymers for the higher melting constituent include polyesters such as polyethylene terephthalate, polyamides such as poly(hexamethylene adipamide) and poly(caproamide), and copolymers and blends thereof. The filaments may also contain minor amounts of other polymer or non-polymer additives, such as antistatic compositions, soil release additives, water or alcohol repellents, etc.

In a preferred embodiment of the invention, the filaments are formed from a bicomponent polymeric structure. The polymeric bicomponent structure may be a sheath/core structure, a side-by-side structure, or other structures which provide that the lower melting gamma radiation stable polyethylene constituent is present over a substantial portion of the surface of the filament and the higher melting polymer constituent is in a substantially continuous form along the length of the filaments. The bicomponent filaments can provide improved aesthetics such as hand and softness based on the surface component of the bicomponent filaments, while providing improved strength, tear resistance and the like due to the stronger core component of the filament. Preferred bicomponent filaments include polyethylene/polyester sheath/core filaments such as polyethylene/polyethylene terephthalate bicomponent sheath/core filaments.

In another embodiment of the present invention, the filaments are formed from a polymer blend. In this embodiment of the invention, the dominant phase is a polymer selected form the group consisting of polyesters and polyamides, and the dispersed phase is a polyethylene. The dispersed phase polymer is present in the blend in an amount of about 1 to 20% by weight, and preferably about 5 to 15% by weight, of the polymer blend so that the lower melting gamma radiation stable polyethylene constituent is present over a substantial portion of the surface of the filament and the higher melting polymer constituent is in a substantially continuous form along the length of the filaments.

The inner ply 12 comprises at least one hydrophobic microporous layer. The microporous layer may comprise a microporous film, a microporous sheet or web formed of thermally consolidated microfibers, or a microporous nonwoven web of microfibers. The microfibers are preferably manufactured in accordance with the process described in Buntin et al. U.S. Pat. No. 3,978,185. The inner ply 12 may suitably have a basis weight in the range of about 10 to 80 gsm, and preferably in the range of about 10 to 30 gsm. The microfibers preferably have a diameter of up to 50 microns, and most desirably the fiber diameter is less than 10 microns.

The polymer used for forming the microporous layer or layers of ply 12 is also preferably selected for its stability to gamma irradiation. In addition, it should be selected so that it is thermally miscible with the lower melting polyethylene constituent of the multiconstituent filaments By "thermally miscible", we mean that the polymers, when heated to thermal bonding temperatures, will be cohesive and will join together to form a single, unitary bond domain. Typically, to be "thermally miscible", the polymers will be of the same chemical composition or of such a similar chemical composition that the polymers are miscible with one another. If of different chemical compositions, the surface energies of the polymers are sufficiently similar such that they readily form a cohesive bond when heated to thermal activation temperature. In contrast, polymers which are not thermally miscible with one another do not have such an affinity to one another to form cohesive bonds. Under thermal bonding conditions, the polymers may bond together, but the bond mechanism is predominately, if not exclusively, a mechanical bond resulting from mechanical interlocking or encapsulation. The polymers do not form a unitary polymer domain but remain as separate identifiable polymer phases. For purposes of the present invention, the microporous layer 12 is suitably formed from a polyethylene. In a preferred embodiment, the thermoplastic meltblown microfibers comprise linear low density polyethylene (LLDPE), prepared by copolymerizing ethylene and an alpha olefin having 3 to 12 carbon atoms. More preferably, the polymer is LLDPE having a melting point of about 125° C.

After the respective plies of the composite nonwoven fabric have been assembled, the plies are bonded. Bonding may be achieved by heating the composite fabric to a temperature sufficient to soften the polyethylene constituent so that it fuses the composite nonwoven fabric together to form a unitary structure. For example, when a bicomponent filament is used, the composite laminate is thermally treated to a temperature sufficient to soften the lower melting polyethylene constituent thereof so that it fuses the nonwoven webs together to form a unitary nonwoven composite fabric.

The plies may be bonded in any of the ways known in the art for achieving thermal fusion bonding. Bonding may be achieved, for example, by the use of a heated calender, ultrasonic welding and similar means. The heated calender may include smooth rolls or patterned or textured rolls. Thus, the fabric may also be embossed, if desired, through the use of textured or patterned rolls, to impart a desired surface texture and to improve or alter the tactile qualities of the composite fabric. The pattern of the embossing rolls may be any of those known in the art, including spot patterns, helical patterns, and the like. The embossing may be in continuous or discontinuous patterns, uniform or random points or a combination thereof, all as are well known in the art.

While a three-ply composite fabric has been shown in the drawings, it is to be understood that the number and arrangement of plies may vary depending upon the particular properties sought for the laminate. For example, several microporous layers can be employed in the invention and/or greater numbers of other fibrous webs can be used. Additionally, at least one of the outer webs may be treated with a treatment agent to render any one of a number of desired properties to the fabric, such as flame retardancy, hydrophilic properties, and the like.

The presence of the lower melting polyethylene constituent at the surface of the spunbonded outer layers 11 and 13 of the composite fabric 10 enables the fabric to be sealed or seamed by fusing the lower melting polyethylene constituent by means of a thermal heat sealer, heated die, ultrasonic sealer, RF sealer or the like. Thus, for example the edges of a fabric can be finished by forming a substantially continuous fusion bond extending the peripheral edge, the fusion bond being formed between the polyethylene constituent of the multiconstituent filaments of the outer spunbond layers 11 and 13 and the polyethylene component of the inner web 12. This property is also advantageous in fabricating products such as protective garments from the composite fabric. Two or more pieces of the composite fabric can be joined together by forming a continuous seam by fusion. The continuous fusion bonded seam maintains the protective barrier properties of the fabric along the seam.

FIG. 2 schematically illustrates one method for forming a composite nonwoven fabric of the invention. A conventional spunbonding apparatus 20 forms a first spunbonded layer 22 of substantially continuous thermoplastic polymer filaments. Web 22 is deposited onto forming screen 24 which is driven in a longitudinal direction by rolls 26.

The spunbonding process involves extruding a polymer through a generally linear die head or spinneret 30 for melt spinning substantially continuous filaments 32. The spinneret preferably produces the filaments in substantially equally spaced arrays and the die orifices are preferably from about 0.002 to about 0.040 inches in diameter.

As shown in FIG. 2, the substantially continuous filaments 32 are extruded from the spinneret 30 and quenched by a supply of cooling air 34. The filaments are directed to an attenuator 36 after they are quenched, and a supply of attenuation air is admitted therein. Although separate quench and attenuation zones are shown in the drawing, it will be apparent to the skilled artisan that the filaments can exit the spinneret 30 directly into the attenuator 36 where the filaments can be quenched, either by the supply of attenuation air or by a separate supply of quench air.

The attenuation air may be directed into the attenuator 36 by an air supply above the entrance end, by a vacuum located below a forming wire or by the use of eductors integrally formed in the attenuator. The air proceeds down the attenuator 36, which narrows in width in the direction away from the spinneret 30, creating a nozzle effect accelerating the air and causing filament attenuation. The air and filaments exit the attenuator 36, and the filaments are collected on the collection screen 24. The attenuator 36 used in the spunbonding process may be of any suitable type known in the art, such as a slot draw apparatus or a tube-type (Lurgi) apparatus.

After the spunbonded layer 22 is deposited onto screen 24, the web passes longitudinally beneath a conventional meltblowing apparatus 40. Meltblowing apparatus 40 forms a meltblown fibrous stream 42 which is deposited on the surface of the spunbonded web 22 to form a meltblown fibrous layer. Meltblowing processes and apparatus are known to the skilled artisan and are disclosed, for example, in U.S. Pat. 3,849,241 to Buntin, et al. and U.S. 4,048,364 to Harding, et al. The meltblowing process involves extruding a molten polymeric material through fine capillaries into fine filamentary streams. The filamentary streams exit the meltblowing spinneret face where they encounter converging streams of high velocity heated gas, typically air, supplied from nozzles 46 and 48. The converging streams of high velocity heated gas attenuate the polymer streams and break the attenuated streams into meltblown microfibers.

A spunbonded web/meltblown web structure 50 is thus formed. The structure 50 is next conveyed by forming screen 24 in the longitudinal direction beneath to a point where a nonwoven web of thermoplastic filaments is formed on the surface thereof. FIG. 2 illustrates a spunbonded layer formed by a second conventional spunbonding apparatus 60. The spunbonding apparatus 60 deposits a spunbonded nonwoven layer onto the composite structure 50 to thereby form a composite structure 64 consisting of a spunbonded web/ meltblown web/spunbonded web.

The composite structure is then passed to a conventional thermal fusion bonding station 70 to provide a composite bonded nonwoven fabric 80. Here the lower melting polyethylene constituent is softened so as to securely fuse the inner meltblown ply to the outer spunbonded plies while maintaining the integrity of the inner meltblown ply. The resultant composite web 80 exits the thermal fusion station 70 and is wound up by conventional means on roll 90.

The thermal fusion station 70 is constructed in a conventional manner as known to the skilled artisan, and advantageously is a calender having bonding rolls 72 and 74 as illustrated in FIG. 2. The bonding rolls 72 and 74 may be smooth rolls, point rolls, helical rolls, or the like.

Although the thermal fusion station is illustrated in FIG. 2 in the form of a calender having bonding rolls, other thermal treating stations, such as through-air bonding, radiant heaters or ultrasonic, microwave and other RF treatments which are capable of bonding the fabric in accordance with the invention can be substituted for the calender of FIG. 2. Such conventional heating stations are known to those skilled in the art.

The method illustrated in FIG. 2 is susceptible to numerous variations. For example, although the schematic illustration of FIG. 2 has been described as forming a spunbonded web directly during an in-line continuous process, it will be apparent that the spunbonded webs can be preformed and supplied as rolls of preformed webs. Similarly, although the meltblown web 42 is shown as being formed directly on the spunbonded web 22, the meltblown web can be preformed and such preformed webs can be combined to form the composite fabric, or can be passed through heating rolls for further consolidation and thereafter passed on to a spunbonded web or can be stored in roll form and fed from a preformed roll onto the spunbonded layer 22. Similarly, the three-layer web 64 can be formed and stored prior to bonding at station 70.

Figure 4:
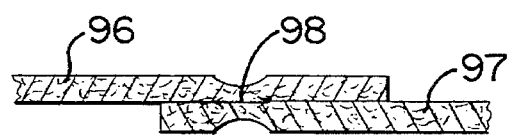
FIG. 4 is a cross sectional view taken along the line 4—4 of FIG. 3 and showing a fusion bonded seam of the garment.

In FIG. 3, the reference character 95 indicates a surgical gown fabricated from the composite nonwoven fabric of the present invention. For use as a surgical gown, the basis weight of the fabric is preferably within the range of 40 to 60 gsm and most desirably within the range of 50 to 60 gsm. The fabric has a hydrostatic head rating of 35 cm or greater and a bacterial filtration efficiency (BFE) rating of 85 percent or greater. The gown 95 is fabricated by seaming precut panels or pieces of the nonwoven fabric together with a seam formed by fusion bonding. More particularly, as seen in FIG. 4, one of the panels 96 has a portion positioned in face-to-face contacting relation with a portion of another of the panels 97, and a seam 98 joins the panels to one another along said contacting portions. The seam 98 is a fusion bond formed between the polyethylene constituent of the multi-constituent filaments of panel 96 and the polyethylene constituent of the multiconstituent filaments of the other panel 97.

The following examples serve to illustrate the invention but are not intended to be limitations thereon.

EXAMPLE 1

Samples of a trilaminate composite fabric were prepared by combining two outer layers of a spunbonded nonwoven fabric formed from 3 denier per filament polyethylene/ polyester (PET) sheath/core bicomponent filaments with a central inner layer of a meltblown web formed from linear low density polyethylene. Samples were prepared using two different basis weights of spunbond bicomponent filament fabric. Bonding was performed using a heated patterned calender. The fabric physical properties are shown in Table 1 below:

TABLE 1

|  |  |  |  |  |
|---|---|---|---|---|
| Spunbond | 20 gsm |  | 15 gsm |  |
| Meltblown | 16.5 gsm |  | 16.5 gsm |  |
| Spunbond | 20 gsm |  | 15 gsm |  |
| Total basis wt. | 1.70 osy |  | 1.47 osy |  |
| Grab tensile (lbs) | AVG | STD | AVG | STD |
| MD | 47.4 | 3.3 | 37.9 | 3.1 |
| CD | 23.5 | 3.1 | 18.9 | 1.9 |
| Hydrostatic pressure (cm) | 39.9 | 1.4 | 35.7 | 2.9 |

TABLE 1-continued

| | | | | |
|---|---|---|---|---|
| Gurley Air Permeability (cfm) | 76.3 | 4.4 | 98.9 | 4.1 |

EXAMPLE 2

Additional samples were prepared as in Example 1 using a 24 gsm linear low density polyethylene meltblown layer and 3 denier per filament polyethylene/polyester (PET) sheath/core bicomponent spunbonded layers of 20 gsm and 15 gsm basis weights respectively. The physical properties are shown in Table 2.

TABLE 2

| PROPERTIES | | |
|---|---|---|
| Spunbond layers | 15 gsm bico | 20 gsm bico |
| Meltblown layer | 24 gsm PE | 24 gsm PE |
| BASIS WEIGHT | | |
| osy | 1.6 | 1.9 |
| gsm | 54.3 | 63.5 |
| GRAB TENSILE, lb | | |
| CD | 18.7 | 25.0 |
| MD | 33.0 | 42.9 |
| GRAB TEA, in-lb | | |
| CD | 26 | 37 |
| MD | 38 | 49 |
| TRAPEZOID TEAR, lb | 9.4 | 11.8 |
| CD | | |
| ELMENDORF TEAR, g | | |
| CD | 1150 | 1421 |
| MD | 686 | 1029 |
| MULLEN BURST, psi | 42.9 | 51.4 |
| HYDROSTATIC HEAD, cm | 37.8 | 38.9 |
| ALCOHOL REPELLENCY | 7 | 7 |
| IMPACT PENETRATION, g | 4.2 | 7.1 |
| AIR PERMEABILITY, cfm | 77.7 | 82.9 |
| HANDLE-O-METER | 89 | 143 |

The invention has been described in considerable detail with reference to its preferred embodiments. However, it will be apparent that numerous variations and modifications can be made without departure from the spirit and scope of the invention as described in the foregoing detailed specification and defined in the appended claims.

That which we claim is:

1. A gamma radiation sterilizable composite nonwoven fabric comprising:

first and second spunbonded nonwoven webs formed of continuous multiconstituent filaments, said first and second spunbonded nonwoven webs defining opposite outer surfaces of the composite nonwoven fabric, the multiconstituent filaments of said first and second webs including a lower melting gamma radiation stable polyethylene polymer constituent and a higher melting gamma radiation stable polymer constituent, the lower melting gamma radiation stable polyethylene constituent being present over a substantial portion of the surface of the filament and the higher melting polymer constituent being in a substantially continuous form along the length of the filaments;

a third nonwoven web sandwiched between said first and second spunbonded nonwoven webs, said third nonwoven web comprising at least one hydrophobic microporous layer formed from a gamma radiation stable polyethylene polymer; and a multiplicity of discrete point bonds throughout said composite fabric bonding said first, second and third webs together to form the composite nonwoven fabric, said discrete point bonds comprising areas where the polyethylene constituent of said multiconstituent filaments and the polyethylene polymer of said third nonwoven web are fused together.

2. The composite nonwoven fabric according to claim 1 having a grab tensile strength of at least 15 pounds in the cross direction (CD) and at least 25 pounds in the machine direction (MD), a Gurley air permeability of at least 35 cfm, and a basis weight in the range of 40 to 120 gsm.

3. The composite nonwoven fabric according to claim 2 having a basis weight in the range of 50 to 60 gsm and a hydrostatic head rating of 35 cm or greater.

4. The composite nonwoven fabric according to claim 1 having a bacterial filtration efficiency (BFE) rating of 85 percent or greater.

5. The composite nonwoven fabric according to claim 1 wherein said higher melting polymer constituent of said multiconstituent filaments is a polyester.

6. The composite nonwoven fabric according to claim 1 wherein said higher melting polymer constituent of said multiconstituent filaments is a polyamide.

7. The composite nonwoven web according to claim 1 wherein said multiconstituent filaments of said first and second webs comprise sheath-core structured bicomponent filaments having a polyester core and a polyethylene sheath.

8. The composite nonwoven web according to claim 1 wherein said multiconstituent filaments of said first and second webs comprise side-by-side structured bicomponent filaments having a polyester component and a polyethylene component.

9. The composite nonwoven web according to claim 1 wherein said multiconstituent filaments of said first and second webs comprise filaments of an unstructured blend of a polyamide polymer and a polyethylene polymer.

10. The composite nonwoven fabric according to claim 1 wherein said at least one hydrophobic microporous layer comprises a nonwoven web of meltblown microfibers.

11. The composite nonwoven fabric according to claim 1 including a substantially continuous seal extending along at least one peripheral edge portion of the fabric, said seal comprising a fusion bond formed between the polyethylene constituent of the multiconstituent filaments of said first and second webs.

12. An article of manufacture comprising two pieces of composite nonwoven fabric according to claim 1, and a seam joining said two fabrics together, said seam comprising a fusion bond formed between the polyethylene constituent of the multiconstituent filaments of said one piece and the polyethylene constituent of the multiconstituent filaments of said other piece.

13. A gamma radiation sterilizable composite nonwoven fabric comprising:

first and second spunbonded nonwoven webs formed of continuous multiconstituent filaments, said first and second spunbonded nonwoven webs defining opposite outer surfaces of the composite nonwoven fabric, the multiconstituent filaments of said first and second webs including a lower melting gamma radiation stable polyethylene polymer constituent and a higher melting gamma radiation stable polymer constituent, the lower melting gamma radiation stable polyethylene constituent being present over a substantial portion of the surface of the filament and the higher melting polymer constituent being in a substantially continuous form along the length of the filaments;

a third nonwoven web sandwiched between said first and second spunbonded nonwoven webs, said third nonwoven web comprising at least one hydrophobic microporous layer formed from a gamma radiation stable polyethylene polymer;

a multiplicity of discrete point bonds throughout said composite fabric bonding said first, second and third webs together to form the composite nonwoven fabric, said discrete point bonds comprising areas where the polyethylene constituent of said multiconstituent filaments and the polyethylene polymer of said third nonwoven web are fused together; and said composite fabric having a grab tensile strength of at least 15 pounds in the cross direction (CD) and at least 25 pounds in the machine direction (MD), a Gurley air permeability of at least 35 cfm, a hydrostatic head rating of 35 cm or greater, and a bacterial filtration efficiency (BFE) rating of 85 percent or greater.

14. A gamma radiation sterilizable composite nonwoven fabric comprising:

first and second spunbonded nonwoven webs formed of continuous multiconstituent filaments, said first and second spunbonded nonwoven webs defining opposite outer surfaces of the composite nonwoven fabric, the multiconstituent filaments of said first and second webs including a lower melting gamma radiation stable polyethylene polymer constituent present at the surface of the filaments and a higher melting gamma radiation stable polyester polymer constituent, the lower melting gamma radiation stable polyethylene constituent being present over a substantial portion of the surface of the filament and the higher melting polymer constituent being in a substantially continuous form along the length of the filaments;

a third nonwoven web of meltblown microfibers sandwiched between said first and second spunbonded nonwoven webs, said microfibers having a fiber diameter of less than 50 microns and being formed from a gamma radiation stable linear low density polyethylene polymer;

a multiplicity of discrete point bonds throughout said composite fabric bonding said first, second and third webs together to form the composite nonwoven fabric, said discrete point bonds comprising areas where the polyethylene constituent of said multiconstituent filaments and the polyethylene microfibers of said third nonwoven web are fused together; and said composite fabric having a grab tensile strength of at least 15 pounds in the cross direction (CD) and at least 25 pounds in the machine direction (MD), a Gurley air permeability of at least 35 cfm, and a basis weight in the range of 40 to 120 gsm.

15. A gamma radiation sterilizable composite nonwoven fabric comprising:

first and second spunbonded nonwoven webs formed of substantially continuous filaments formed of a polymer blend comprising a higher melting polyester or polyamide dominant phase and a lower melting gamma radiation stable polyethylene phase dispersed therein, the lower melting gamma radiation stable polyethylene phase being present over a substantial portion of the surface of the filament and the higher melting polyester or polyamide phase being in a substantially continuous form along the length of the filaments; and a third nonwoven web of polyethylene meltblown microfibers formed of a thermoplastic polymer composition stable to gamma radiation sterilization and having a fiber diameter of less than 50 microns, said third nonwoven web sandwiched between said first and second nonwoven webs to form a composite nonwoven fabric;

a multiplicity of discrete point bonds throughout said composite fabric bonding said first, second and third webs together to form the composite nonwoven fabric, said discrete point bonds comprising areas where the polyethylene constituent of said multiconstituent filaments and the polyethylene microfibers of said third nonwoven web are fused together; and said composite fabric having a grab tensile strength of at least 15 pounds in the cross direction (CD) and at least 25 pounds in the machine direction (MD), a Gurley air permeability of at least 35 cfm, and a basis weight in the range of 40 to 120 gsm.

16. A gamma radiation sterilizable protective garment comprising at least two panels of a gamma radiation sterilizable composite nonwoven fabric, said composite nonwoven fabric comprising first and second spunbonded nonwoven webs formed of continuous multiconstituent filaments, said first and second spunbonded nonwoven webs defining opposite outer surfaces of the composite nonwoven fabric, the multiconstituent filaments of said first and second webs including a lower melting gamma radiation stable polyethylene polymer constituent and a higher melting gamma radiation stable polymer constituent, the lower melting gamma radiation stable polyethylene constituent being present over a substantial portion of the surface of the filament and the higher melting polymer constituent being in a substantially continuous form along the length of the filaments; a third nonwoven web sandwiched between said first and second spunbonded nonwoven webs, said third nonwoven web comprising at least one hydrophobic microporous layer formed from a gamma radiation stable polyethylene polymer; and a multiplicity of discrete point bonds throughout said composite fabric bonding said first, second and third webs together to form the composite nonwoven fabric, said discrete point bonds comprising areas where the polyethylene constituent of said multiconstituent filaments and the polyethylene polymer of said third nonwoven web are fused together;

one of said panels having a portion positioned in face-to-face contacting relation with a portion of another of said panels; and a seam joining said panels to one another along said contacting portions, said seam comprising a fusion bond formed between the polyethylene constituent of the multiconstituent filaments of said one panel and the polyethylene constituent of the multiconstituent filaments of said other panel.

17. The protective garment according to claim 16 wherein said panels of gamma radiation sterilizable composite nonwoven fabric have a grab tensile strength of at least 15 pounds in the cross direction (CD) and at least 25 pounds in the machine direction (MD), a Gurley air permeability of at least 35 cfm, and a basis weight in the range of 40 to 120 gsm.

\* \* \* \* \*

UNITED STATES PATENT AND TRADEMARK OFFICE
CERTIFICATE OF CORRECTION

PATENT NO. : 5,484,645

DATED : January 16, 1996

INVENTOR(S) : Deborah K. Lickfield et al.

It is certified that error appears in the above-identified patent and that said Letters Patent is hereby corrected as shown below:

On the title page, item: [63] Related U.S. Application Data should read as follows:

-- Continuation-in-part of Ser. No. 896,323, Jun. 10, 1992, Pat. No. 5,415,925, and a continuation-in-part of Ser. No. 93,796, Jul. 19, 1993, and a continuation-in-part of Ser. No. 783,696, Oct. 30, 1991 --.

Column 1, line 10, after "Jul. 19, 1993" and before the "." insert -- and a continuation-in-part of Ser. No. 783,696, Oct. 30, 1991 --.

Column 4, line 31, delete "a" before "conventional".

Column 5, line 48, after "filaments" insert a period -- . --.

Column 5, line 62, "predominately" should be -- predominantly --.

Signed and Sealed this

Sixteenth Day of July, 1996

*Attest:*

BRUCE LEHMAN

*Attesting Officer*       *Commissioner of Patents and Trademarks*